US012395839B2

(12) United States Patent
Kamath et al.

(10) Patent No.: US 12,395,839 B2
(45) Date of Patent: Aug. 19, 2025

(54) SECURED CREDENTIAL SHARING OVER WI-FI PROTECTED SETUP (71) Applicant: Cypress Semiconductor Corporation, San Jose, CA (US)

(72) Inventors: Vinayak Kamath, Shakthinagar (IN); Dhruvaraja Kunjar, Munnekolala (IN); Pramod Prakash Kanni, Gazipur (IN)

(73) Assignee: Cypress Semiconductor Corporation, San Jose, CA (US)

( * ) Notice: Subject to any disclaimer, the term of this patent is extended or adjusted under 35 U.S.C. 154(b) by 582 days.

(21) Appl. No.: 16/802,825

(22) Filed: Feb. 27, 2020

(65) Prior Publication Data
US 2023/0075274 A1 Mar. 9, 2023

Related U.S. Application Data (60) Provisional application No. 62/811,659, filed on Feb. 28, 2019.

(51) Int. Cl.
| | |
|---|---|
| *H04W 12/06* | (2021.01) |
| *H04W 4/80* | (2018.01) |
| *H04W 12/73* | (2021.01) |
| *H04W 84/12* | (2009.01) |
| *H04W 92/10* | (2009.01) |
| *H04W 88/04* | (2009.01) |

(52) U.S. Cl.
CPC ............. *H04W 12/06* (2013.01); *H04W 4/80* (2018.02); *H04W 12/73* (2021.01); *H04W 84/12* (2013.01); *H04W 92/10* (2013.01); *H04W 88/04* (2013.01)

(58) Field of Classification Search
CPC ................... H04W 4/50–60; H04W 76/00–25
See application file for complete search history.

(56) References Cited

U.S. PATENT DOCUMENTS

| | | | |
|---|---|---|---|
| 8,554,970 | B2 | 10/2013 | Suumäki et al. |
| 8,818,276 | B2 | 8/2014 | Kiukkonen et al. |
| 9,066,197 | B2 | 6/2015 | Kiukkonen et al. |
| 9,258,712 | B2 | 2/2016 | Kiukkonen et al. |
| 9,288,228 | B2 | 3/2016 | Suumäki |
| 9,456,356 | B2 | 9/2016 | Bradley |
| 9,485,708 | B2 | 11/2016 | Patil et al. |

(Continued)

FOREIGN PATENT DOCUMENTS

| | | |
|---|---|---|
| CN | 101563881 A | 10/2009 |
| CN | 103179560 A | 6/2013 |

(Continued)

OTHER PUBLICATIONS

International Search Report for International Application No. PCT/US2020/020293 dated Jun. 4, 2020; 2 pages.

(Continued)

*Primary Examiner* — San Htun (57) ABSTRACT

A method, apparatus, and system for providing temporary access point (AP) functionality to an intermediary device to provide wireless network credentials to a wireless device (STA) to be connected to a wireless network including an AP is described. The intermediary device may mimic the AP to provide wireless network credentials to the wireless device and discontinue an onboarding session to allow the wireless device to access the AP directly.

17 Claims, 9 Drawing Sheets (56) References Cited

U.S. PATENT DOCUMENTS

| | | | |
|---|---|---|---|
| 9,706,383 | B2 | 7/2017 | Kiukkonen et al. |
| 9,848,332 | B2 | 12/2017 | Liu et al. |
| 9,913,107 | B2 | 3/2018 | Kawakami et al. |
| 10,270,797 | B1 | 4/2019 | Mincher et al. |
| 11,251,960 | B1* | 2/2022 | Wei ................ H04W 12/04 |
| 2007/0097934 | A1* | 5/2007 | Walker ............ H04L 63/0428 |
| | | | 370/395.53 |
| 2011/0176457 | A1 | 7/2011 | Yee |
| 2013/0286889 | A1* | 10/2013 | Cherian ............ H04L 63/18 |
| | | | 370/254 |
| 2014/0035527 | A1 | 2/2014 | Hayashigawa et al. |
| 2014/0075523 | A1 | 3/2014 | Tuomaala et al. |
| 2014/0355527 | A1* | 12/2014 | Vaidya ............ H04W 76/15 |
| | | | 370/329 |
| 2014/0362841 | A1* | 12/2014 | Shibata ............ H04W 48/18 |
| | | | 370/338 |
| 2015/0026779 | A1 | 1/2015 | Ilsar et al. |
| 2015/0092737 | A1 | 4/2015 | Damodaran |
| 2015/0124968 | A1 | 5/2015 | Scott et al. |
| 2015/0220290 | A1* | 8/2015 | Park ............ H04N 1/00307 |
| | | | 358/1.13 |
| 2015/0327060 | A1 | 11/2015 | Gilson et al. |
| 2017/0094451 | A1* | 3/2017 | Terashita ............ H04W 4/06 |
| 2018/0184485 | A1* | 6/2018 | Shibata ............ H04W 76/36 |
| 2018/0234840 | A1 | 8/2018 | Nakamura |
| 2018/0242378 | A1 | 8/2018 | Suzuki et al. |

FOREIGN PATENT DOCUMENTS

| | | |
|---|---|---|
| CN | 106375945 A | 2/2017 |
| WO | 2015071395 A1 | 5/2015 |

OTHER PUBLICATIONS

Written Opinion of the International Searching Authority for International Application No. PCT/US2020/020293 dated Jun. 4, 2020; 7 pages.

Wi-Fi Protected Setup (WPS) Configuration on WAP121 and WAP321 Access Points, Cisco Small Business 300 Series Wireless Access Points, Cisco.com, Dec. 11, 2018, pp. 1-4; 4 pages.

Chinese Patent Office Action from Application 202080017165.3 dated Jan. 25, 2024; 12 pages.

Peng Zhao, et al., Trident: Context Based Reverse Authentication for Phishing AP Detection in Commodity WIFI Networks 2016 IEEE 84th Vehicular Technology Conference (VTC-Fall) dated Mar. 20, 2017; 5 pages.

Li Wen-lian, Security Management of Family Computer Network Based on WiFi "Journal of Jiamusi Vocational Institute", dated Nov. 15, 2017; 5 pages.

Chinese Office Action from Application 202080017165.3 dated Jul. 25, 2024; 6 pages.

* cited by examiner

SECURED CREDENTIAL SHARING OVER WI-FI PROTECTED SETUP

PRIORITY

This patent application claims priority to U.S. Provisional Patent Application No. 62/811,659, filed Feb. 28, 2019, which is incorporated herein by reference.

TECHNICAL FIELD

The described embodiments relate generally to wireless networking. More particularly, the described embodiments relate to methods, systems and apparatuses for onboarding a wireless device onto a secure wireless network.

BACKGROUND

Many companies are building products that benefit from a connection to a cloud service via the internet. For example, whitegoods manufacturers are connecting appliances like dishwashers and refrigerators to the internet to provide better customer service through remote access to the devices, and TV manufacturers are using internet connectivity to enable content streaming.

Wi-Fi (Wireless Fidelity) is becoming the predominant connectivity technology for consumer connected products as well as many industrial and commercial connected products.

However, connecting these devices to the internet through Wi-Fi is difficult for some consumers; sometimes consumers have trouble entering the credentials like SSID and password accurately, and in many cases the inconvenience of entering Wi-Fi credentials and the dislike of the process prevents customers from buying connected products in the first place. However, the model of Wi-Fi requires the Wi-Fi credentials to be put in the device in order to access the local network and the full bandwidth of the internet service. Onboarding a wireless device onto a secure network, such as Wi-Fi can be time consuming and require updates as Wi-Fi credentialing information is changed. This can be time consuming and inconvenient, and result in even more expensive support calls for manufacturers and internet service providers. Additionally, hardware-based methods, such as Wi-Fi Protected Setup (WPS) may require physical access to routers or other devices that is not optimal.

It is desirable to have a system, method and apparatus for providing wireless network credentials to wireless devices which is fast, can onboard multiple devices on the secure network with minimal latency, easy to set-up and requires minimal user-intervention. Such a system, method and apparatus will use a provisioning device (such as mobile phone) with which consumers are familiar and provides an increased level of security.

SUMMARY

An embodiment includes a method for providing wireless network credentials to a station (STA) by mimicking an access point (AP) by an intermediary device. The intermediary device may have previously paired with the AP and the mimicking may be by way or beginning a WPS session or a session of another protocol type, such as EasyConnect. A handshake between the intermediary device and the STA may establish a connection therebetween and by which wireless network credentials may be passed to the STA. Network credentials may also be provided to the STA via near-field communication (NFC). The intermediary device may then discontinue the WPS session (or a session of some other protocol type) to allow the STA to communicate with the AP. In one embodiment, the intermediary device may be in concurrent communication with both the AP and the STA. This concurrent communication may be enable by real-time simultaneous dual band (RSDB) or virtual simultaneous dual band (VSDB) operation of the intermediary device. The intermediary device may be further configured to provide network credentials to multiple STAs concurrently.

The method may further include the use of a graphical user interface (GUI) for displaying the status of the wireless network credential transfer, the available APs and STAs, and protocols that may be used for the transfer. The GUI may be displayed on a handheld device, such as a smart phone or mobile handset. The GUI may also be run on another computing device, such as a tablet, a desktop computer, or a laptop computer.

In another embodiment, a non-transitory, computer-readable medium may contain instructions for a controller of an intermediary device. The instructions may be used to provide wireless network credentials to a station (STA) by mimicking an access point (AP) by the intermediary device. The intermediary device may have previously paired with the AP and the mimicking may be by way or beginning a WPS session or a session of another protocol type, such as EasyConnect. A handshake between the intermediary device and the STA may establish a connection therebetween and by which wireless network credentials may be passed to the STA. Network credentials may also be provided to the STA via near-field communication (NFC). The intermediary device may then discontinue the WPS session (or a session of some other protocol type) to allow the STA to communicate with the AP. In one embodiment, the intermediary device may be in concurrent communication with both the AP and the STA. This concurrent communication may be enable by real-time simultaneous dual band (RSDB) or virtual simultaneous dual band (VSDB) operation of the intermediary device. The intermediary device may be further configured to provide network credentials to multiple STAs concurrently.

In another embodiment, a STA may be configured to access a wireless network including an AP upon receipt of valid wireless network credentials. An intermediary device, which may be previously associated with the AP, may provide wireless network credentials by mimicking the AP either with the same protocol used by the AP or by another protocol. A handshake between the intermediary device and the STA may establish a connection therebetween and by which wireless network credentials may be passed to the STA. Network credentials may also be provided to the STA via near-field communication (NFC). The intermediary device may then discontinue the WPS session (or a session of some other protocol type) to allow the STA to communicate with the AP. In one embodiment, the intermediary device may be in concurrent communication with both the AP and the STA. This concurrent communication may be enable by real-time simultaneous dual band (RSDB) or virtual simultaneous dual band (VSDB) operation of the intermediary device. The intermediary device may be further configured to provide network credentials to multiple STAs concurrently.

Other aspects and advantages of the described embodiments will become apparent from the following detailed description, taken in conjunction with the accompanying drawings, illustrating by way of example the principles of the described embodiments.

DETAILED DESCRIPTION

The following description sets forth numerous specific details such as examples of specific systems, components, methods, and so forth, in order to provide a good understanding of various embodiments of the communication schemes and techniques. It will be apparent to one skilled in the art, however, that at least some embodiments may be practiced without these specific details. In other instances, well-known components or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

References in the description to "an embodiment", "one embodiment", "an example embodiment", "some embodiments", and "various embodiments" mean that the particular feature, structure, or characteristic being referred to is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

In various embodiments, the communication schemes and techniques described herein may comprise one or more methods that are executed by one or more devices and/or controllers thereof. Although the operations of such method(s) are shown and described hereinafter in a particular order, the operations of each method may be altered so that certain operations may be performed in a different order or so that certain operation(s) may be performed, at least in part, concurrently and/or in parallel with other operations. In other embodiments, instructions or sub-operations of distinct operations may be executed in an intermittent and/or alternating manner. Thus, the various method embodiments of the described techniques, as well as the order of operations therein, are to be regarded in an illustrative rather than a restrictive sense.

The described embodiments include systems, methods, and apparatuses for onboarding a wireless device onto a secure network with an intermediate device.

Onboarding a wireless device onto a secure network may not have a rich user interface, creating difficulty in the process. The existing solutions—which are mostly based on local communication between wireless devices can be slow, difficult to set-up (and re set-up), requiring manual intervention and, hence, difficult to operate for multiple devices.

Networks, including home and local personal networks are often configured with layer-2 security such as Wi-Fi Protected Access (WPA), WPA2 or WPA3. Network configurations and credential information may be exchanged between devices, such as an access point (AP) and a station (STA) over a variety of out-of-band mediums, including Bluetooth (BT), Bluetooth Low Energy (BLE), near-field communication (NFC), and internet technologies. The network profile (network name and passphrase) may also be configured or entered manually by a user.

Figure 1:
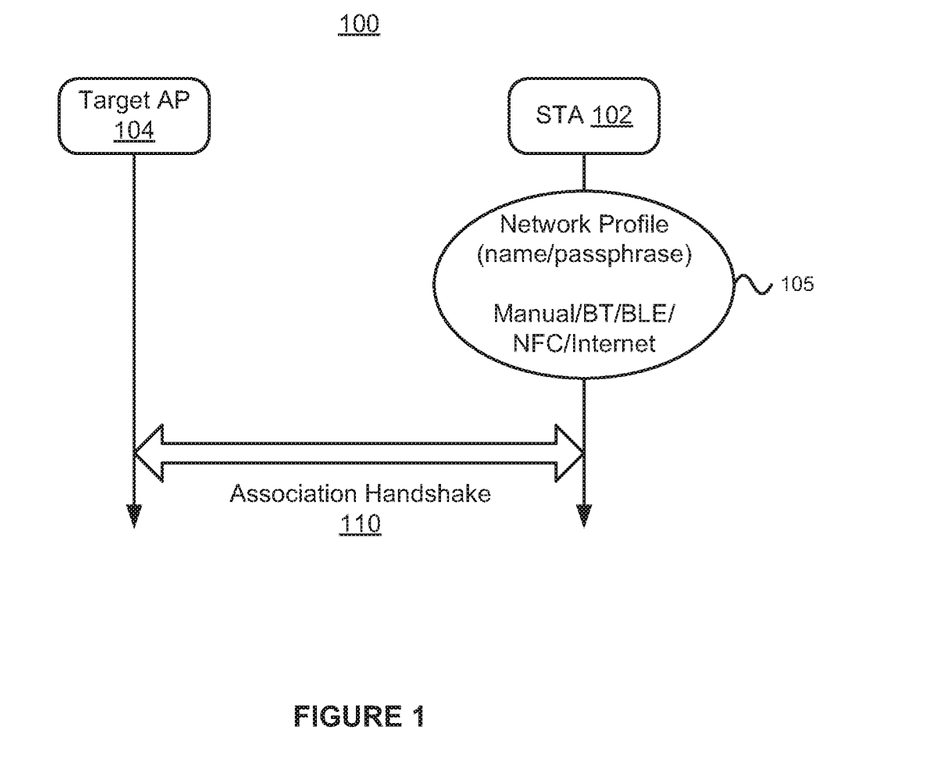
FIG. 1 shows a scheme for providing secure network credentials from r a Target AP to a station, according to one embodiment.

FIG. 1 illustrates a method 100 for provisioning of a STA 102 onto an AP 104. The network profile information for AP 104 may be entered into STA 102 manually, or by another means (including BT, BLE, NFC or internet technologies) in step 105. In one embodiment, delivery of the network credentials may use WiFi Protected Setup (WPS) methods. Association between STA 102 and AP 104 may then be completed using a 4-way handshake in step 110. While a 4-way handshake is illustrated, one of ordinary skill in the art would recognize that more or fewer steps may be used, depending on the protocol. Once association is completed, STA 102 may be in operative and secure wireless communication with AP 104.

Figure 2:
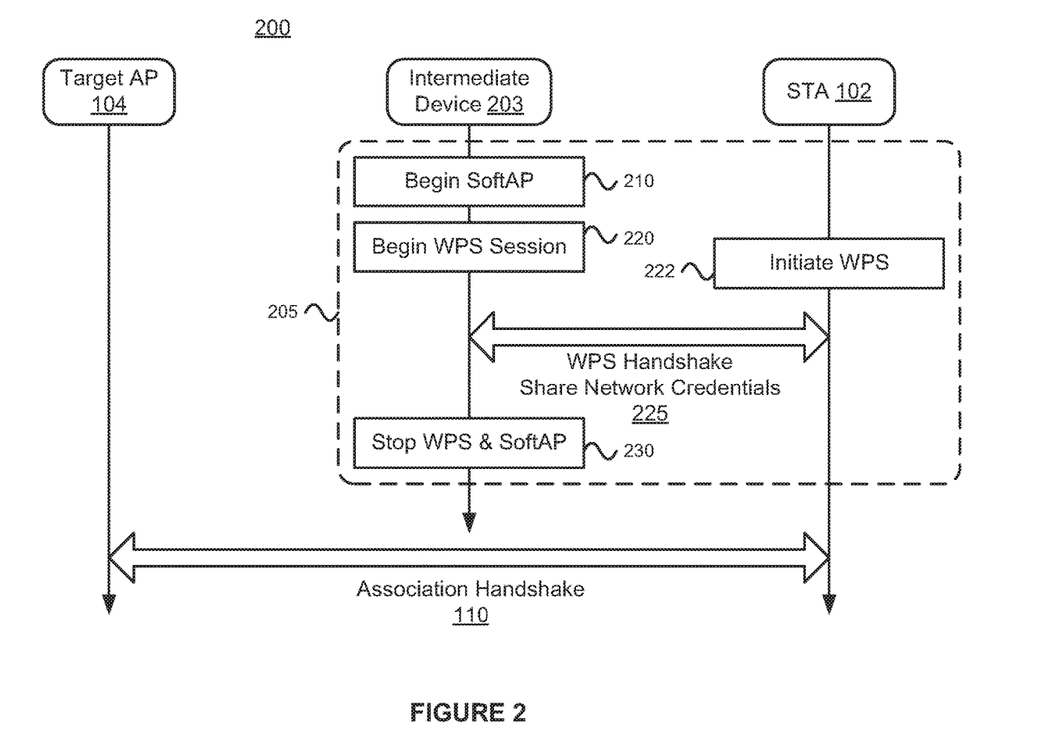
FIG. 2 shows a scheme for providing secure network credentials from a Target AP to a station using an intermediate device mimicking the Target AP, according to one embodiment.

FIG. 2 illustrates a method 200 for provisioning of a STA 102 onto a wireless network including Target AP 104 using an intermediary device 203. Intermediary device 203 may ease the wireless network credential exchange between STA 102 and Target AP 104. Intermediary device 203 may be a wireless local area network (WLAN) device that is already provisioned with the wireless network credentials of Target AP 104. Intermediary device may mimic Target AP 104 in step 205 for a brief period to deliver the network credentials for Target AP 104 to STA 102. In one embodiment, delivery of the network credentials may use WiFi Protected Setup (WPS) methods.

Mimicking Target AP 104 in step 205 may include beginning a software-enabled access point (softAP) in step 210. A soft AP may allow the intermediary device to operate like an access point or a virtual router. In one embodiment the intermediary device 203 may then begin a secure credential provisioning protocol such as WPS in step 220. With the WPS session begun, intermediary device 203 may begin beaconing and start the WPS registrar. STA 104 may then initiate a WPS session in step 222. Initiation of the WPS may be via a graphical user interface (GUI) or through a mechanical WPS button on STA 102. A WPS handshake in step 225 may be used to share the network credentials for Target AP 104. Wireless access for STA 102 may be only to intermediary device 203 and may be temporary until the WPS session is terminated. The WPS handshake may include the intermediary device 203 running the basic service set (BSS) and WPS registrar for long enough to complete the WPS handshake Once network credentials are shared with STA 104, intermediary device 203 may discontinue the softAP and WPS session in step 230. Discontinuation of the BSS by the intermediary device 203 may allow STA 102 to connect automatically to Target AP 104. Association between STA 102 and AP 104 may then be completed using a 4-way handshake in step 110 (as shown in FIG. 1). While a 4-way handshake is illustrated, one of ordinary skill in the art would recognize that more or fewer steps may be used, depending on the protocol. This communication may occur directly between STA 102 and Target AP 104. Once association is completed, STA 102 may be in operative and secure wireless communication with AP 104.

To reduce or eliminate potential interference with devices already provisioned to and in operative communication with Target AP 104, Intermediate Device 203 may only accept devices on its "network" that are in WPS mode, meaning that they are not roaming and are seeking new connection. In another embodiment, Intermediate Device 203 may reduce its transmit power so that its range of communication is low enough that only devices in close proximity are able to receive its beaconing. In still another embodiment, Intermediate Device 203 may only accept devices that are in WPS mode or similar secure credential provisioning mode and reduce its transmit power to reduce its effective range. Additional isolation methods may also be employed.

Figure 3:
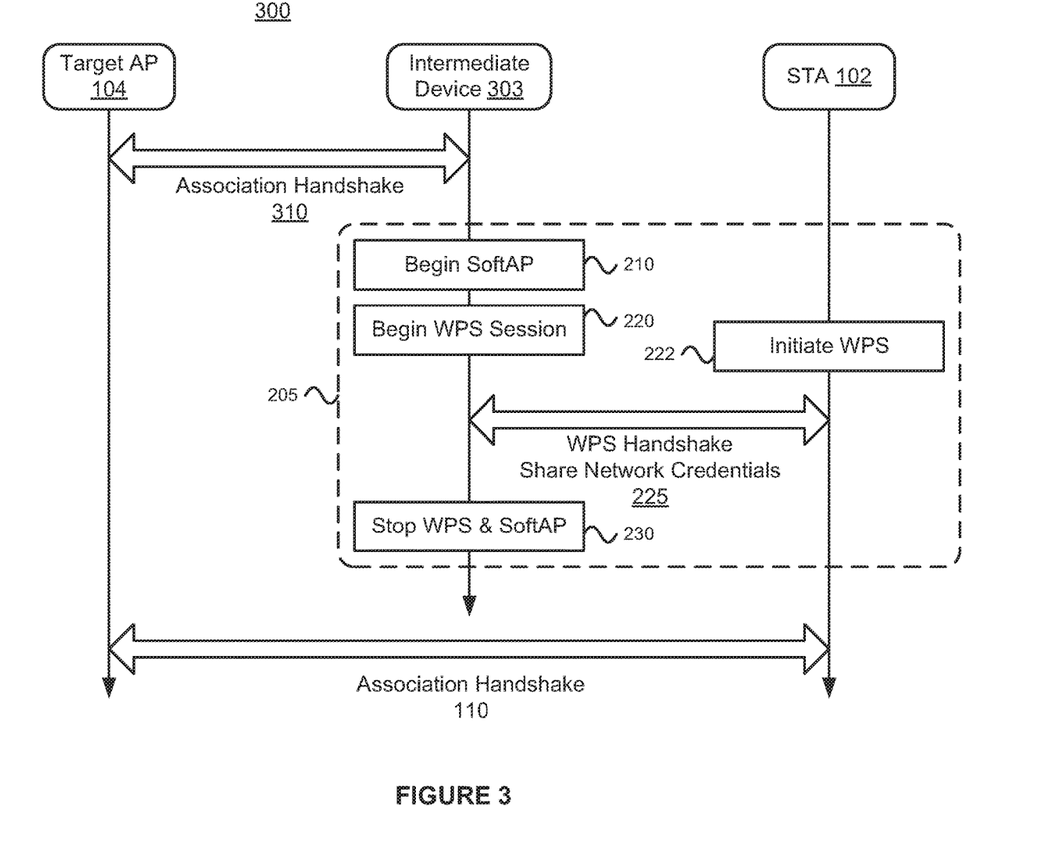
FIG. 3 shows a scheme for providing secure network credentials from a Target AP to a station using an intermediate device mimicking the Target AP while in operative communication with the Target AP, according to one embodiment.

FIG. 3 illustrates a method 300 for provisioning of a STA 102 onto an AP 104 using an intermediary device 303 operating as a real-time simultaneous dual band (RSDB) or virtual simultaneous dual band (VSDB) device to mimic Target AP 104. Intermediate device 303 may be in operative communication with Target AP 104 after association using a 4-way handshake in step 310. While a 4-way handshake is illustrated, one of ordinary skill in the art would recognize that more or fewer steps may be used, depending on the protocol. Using RSDB or VSDB, Intermediate Device 303 may initiate a SoftAP in step 210 of the STA provisioning step 205 while remaining in operative communication with Target AP 104. Intermediary device 303 may then begin a WPS session in step 220. With the WPS session begun, intermediary device 303 may start beaconing and the WPS registrar. STA 104 may then initiate a WPS in step 222. Initiation of the WPS may be via a GUI or through a mechanical WPS button. A WPS handshake in step 225 may be used to share the network credentials for Target AP 104. The WPS handshake may include the intermediary device 303 running the basic service set (BSS) and WPS registrar for long enough to complete the WPS handshake. Once network credentials are shared with STA 104, intermediary device 303 may discontinue the softAP and WPS in step 230. Discontinuation of the BSS by the intermediary device 303 may allow STA 102 to connect automatically to Target AP 104. Association between STA 102 and AP 104 may then be completed using a 4-way handshake in step 110. While a 4-way handshake is illustrated, one of ordinary skill in the art would recognize that more or fewer steps may be used, depending on the protocol. This communication may occur directly between STA 102 and Target AP 104. Once association is completed, both Intermediate Device 303 and STA 102 may be in operative and secure wireless communication with AP 104.

Figure 4:
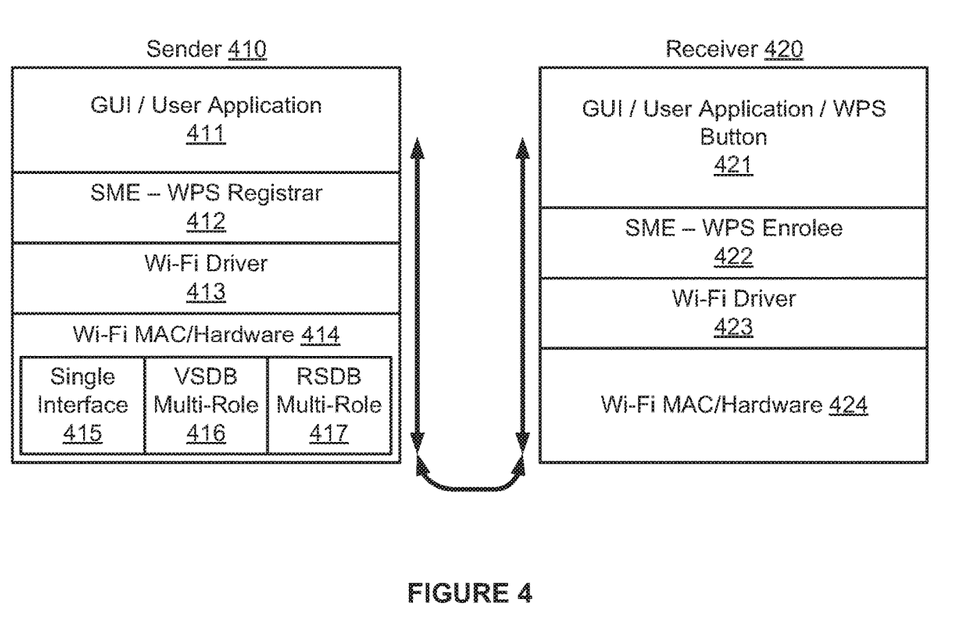
FIG. 4 illustrates software/firmware/hardware stacks for senders and receivers of wireless network credential information, according to one embodiment.

FIG. 4 illustrates example software/firmware/hardware stacks for a sender station (sender) 410 and a receiver station (receiver) 420. For sender 410, there may be a gGUI/user application 411 which provides a user-friendly interface for configuration and control of network credentials. GUI 411 may provide a graphical representation of sender 410's operation mimicking the Target AP and provide a user with indications of the available devices, the status of credential transfer, and control over the WPS operation of the intermediate device (sender 410). A supplicant management entity (SME) or WPS registrar 212 may be used to manage the devices on the wireless network. Information for the SME/WPS registrar 212 may be received by a Wi-Fi driver coupled to Wi-Fi MAC/hardware for transmission and receipt of wireless signals from and by the sender 410. Wi-Fi MAC/Hardware 414 may include several interfaces depending on the various modes in which sender 410 may operate. Interfaces may include single communication interface 415, which allows sender 410 to communicate with a Target AP or a STA, but not both at the same time. Interfaces may also include VSDB and RSDB multi-role interfaces 416 and 417, which allow sender 410 to communicate with a Target AP and a STA simultaneously, or virtually simultaneously.

Receiver 420 may include similar software/firmware/hardware blocks as sender 410. Wi-Fi MAC/Hardware 424 may be used to send/receive wireless signals to/from sender 410. Wi-Fi driver 423 may be used to control Wi-Fi MAC/Hardware 424 and to convert signals received in Wi-Fi MAC/Hardware to digital information for sender 420. SME-WPS Enrollee block 422 may be used to store wireless credential information received from Wi-Fi Driver 423, and GUI/WPS Button 421 may be used as an interface between a user and the rest of the device for procuring network credentials.

Figure 5:
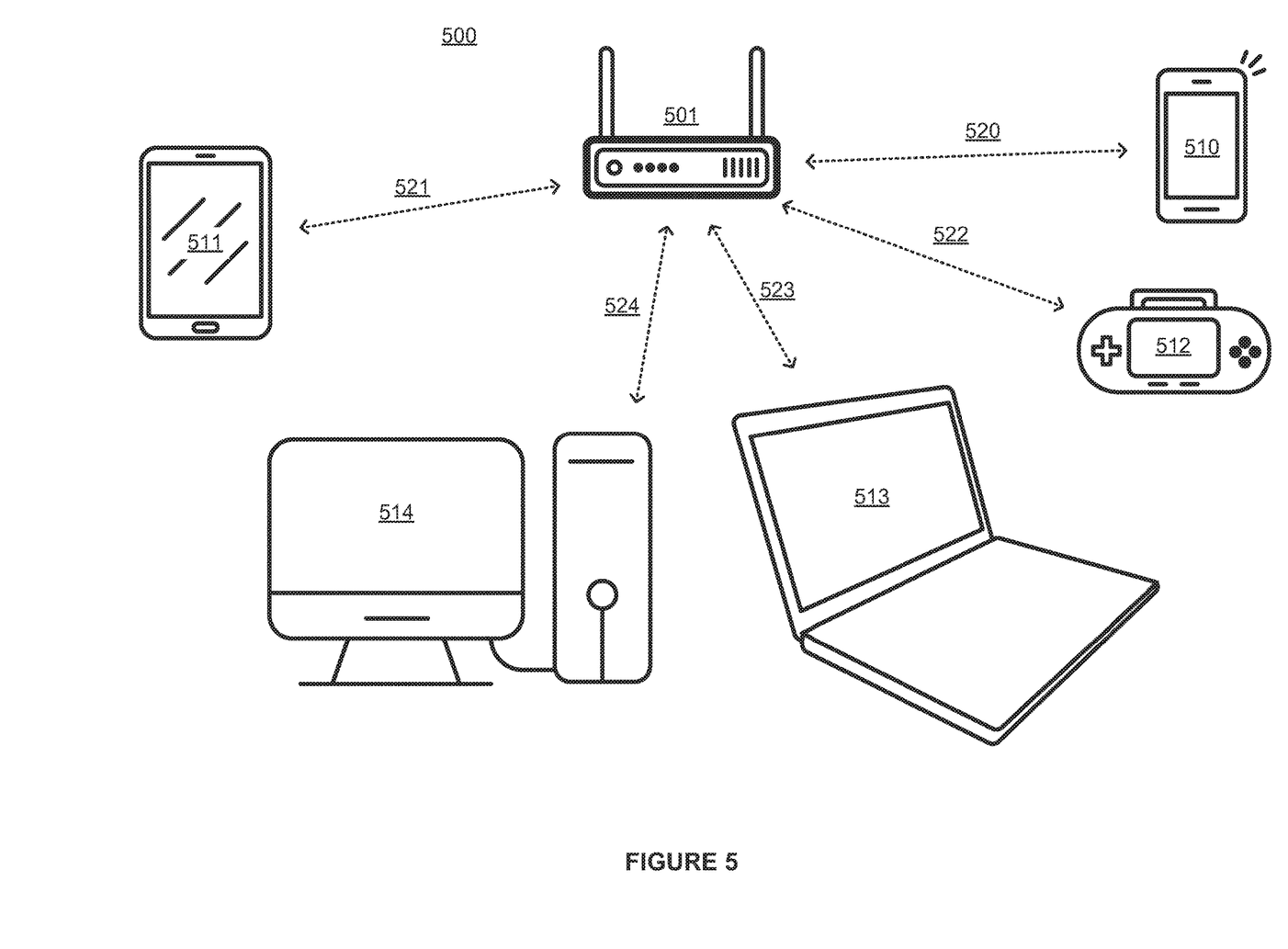
FIG. 5 illustrates a system including multiple wireless devices in operative, wireless communication with a router, according to one embodiment.

FIG. 5 illustrates a wireless system 500, wherein wireless devices (STAs) are provisioned onto a router (Target AP) individually. Wireless devices may include a mobile handset (smartphone) 510, a tablet 511, a portable gaming device 512, a laptop computer 513, or a desktop computer 514. While only one of each type of wireless device is illustrated, one or ordinary skill would understand that multiple of each wireless device may be connected to router 501. Additionally, not all of the types of wireless device need be connected to router 500. Still further, device types not shown, but that would be connected to router 500 are also possible in FIG. 5, although now shown for ease of illustration and explanation. Connections of each wireless device to router 501 are illustrated as connections 520-524. In wireless system 500, each wireless device 510-514 must receive its credentials from router 501 itself. If WPS is used, router 501 must be reached by a user to activate the WPS beacon. Two scenarios may occur: either router 501 is inaccessible, or router 501 may be accessible, but not as easily as desired. If a new device, for example, another smartphone similar to smartphone 510 is desired to provision onto a wireless network including router 501 using WPS, there may be no way to complete the provisioning the new device without physically touching router 501.

Figure 6:
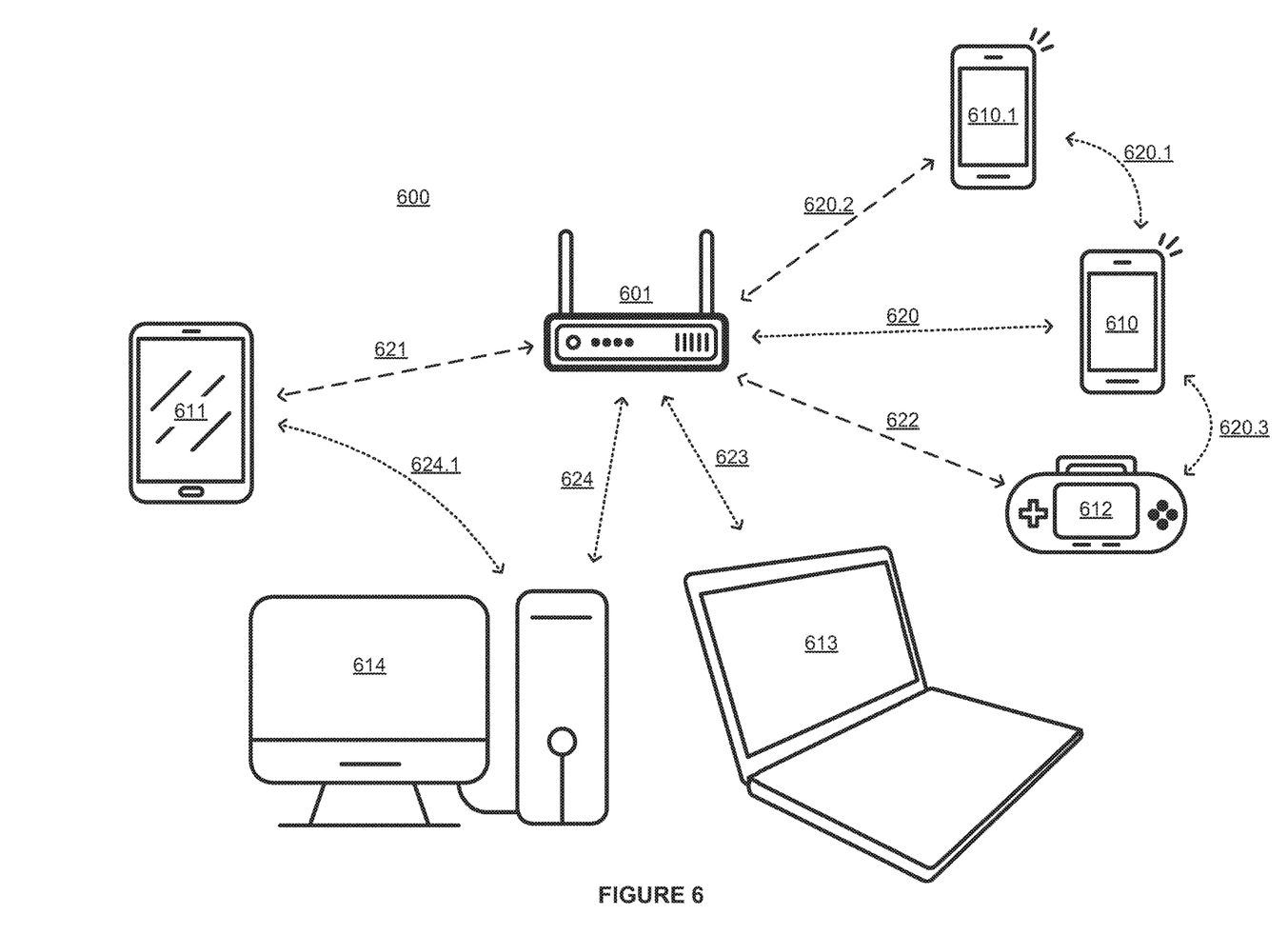
FIG. 6 illustrates a system including multiple wireless devices in operative, wireless communication with a router, wherein at least one wireless device is configured to mimic the router to provide wireless network credential information to at least one other device, according to one embodiment.

FIG. 6 illustrates a wireless system 600, wherein wireless devices may be provisioned onto a wireless network including router 601 using WPS without physical contact with router 601. Mobile handset (smart phone) 610, laptop computer 613, and desktop computer 614 may be in operative communication with router 601 over wireless connections 620, 623, and 624, respectively. Provisioning on mobile handset 610, laptop computer 613 and desktop computer 624 may be completed using WPS or some other method (see FIG. 1). But for the purposes of explanation of FIG. 6, they are each already provisioned onto the wireless network including router 601 as the AP. If a new wireless handset 610.1 is within range of and wants to join the network including router 601, wireless handset 610 may mimic router 601 as described in FIG. 2 or 3. A wireless connection 620.1 may be established between wireless handset 610 and wireless handset 610.1. Wireless handset 610 may appear to wireless handset 610.1 as router 601 and may provide wireless network credentials for router 601 to wireless handset 610.1. Upon delivery of the wireless network credentials, wireless handset 610 may terminate WPS operation and the SoftAP, as described with regard to FIGS. 2 and 3, and wireless handset 610.1 may associate with router 601 over wireless connection 620.2.

Wireless handset 610 may also be used to provision onto the wireless network of router 601 portable gaming device 612. As with wireless handset 610.1, portable gaming device 612 may connect to wireless handset 610 over wireless connection 620.3 when wireless handset 610 is mimicking router 601. The wireless network credentials for router 601 may then be provided to portable gaming device 312 before wireless handset 610 terminates WPS operation and the SoftAP. Portable gaming device 612 may then connect to router 601 over wireless connection 620.4.

In one embodiment, the delivery of wireless network credentials for router 601 may be completed in series for each device wirelessly connected to mobile handset 610. That is, mobile handset 610 may mimic router 601 and pass wireless network credentials to only one new wireless device at a time. A new WPS session may begin for each new STA to be provided wireless network credentials. In another embodiment, mobile handset 610 may provide wireless network credentials to all new wireless devices simultaneously or concurrently and as needed, as long as the SoftAP and WPS sessions are active.

Also in FIG. 6, desktop computer 614, which is in operative communication with router 601 may be used to provide network credentials to tablet 611. Desktop computer 614 may mimic router 601 using a SoftAP and WPS session, establishing a wireless connection 624.1 with tablet 611. Once wireless network credentials are delivered to tablet 611, desktop computer 614 may terminate the SoftAP and WPS session and tablet 611 may associate with router 601 over wireless connection 621 using the wireless network credentials provided by desktop computer 614.

The system 600 of FIG. 6 may be particularly useful when security configuration information (such as WPA2-Personal with AES encryption) is complex. If a user wishes to provide access to a local network quickly to another user, who is in possession of a device not on the local network, the use of WPS methodology allows for quicker and easier transfer of wireless network credential information.

Figure 7A:
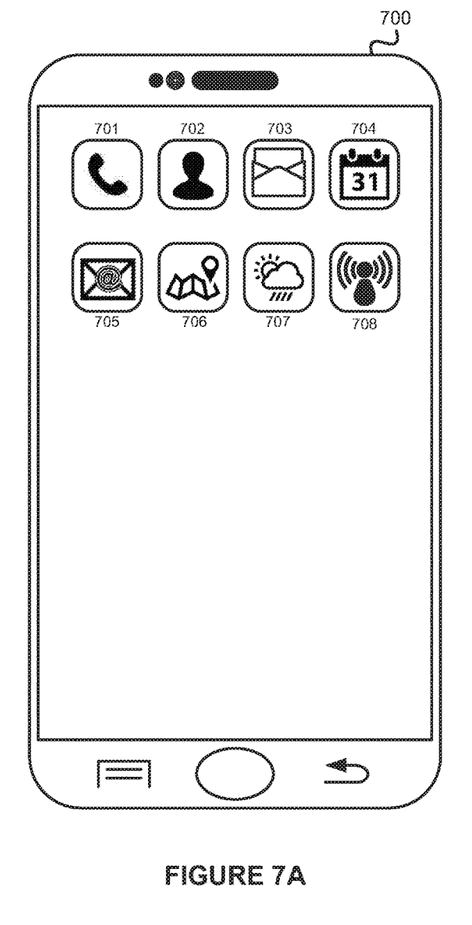
FIGS. 7A-C illustrate a graphical user interface (GUI) for enabling mimicking of a Target AP by an intermediate device for providing wireless network credential information to a station, according to one embodiment.
Figure 7B:
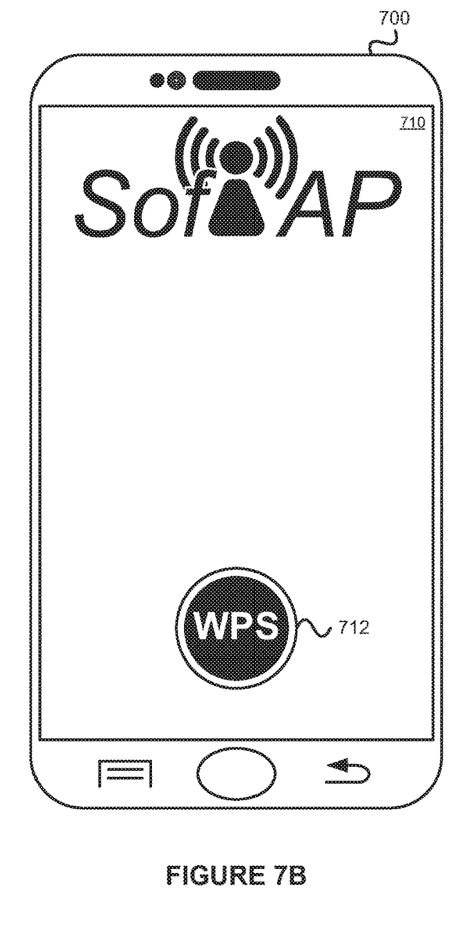
Figure 7C:
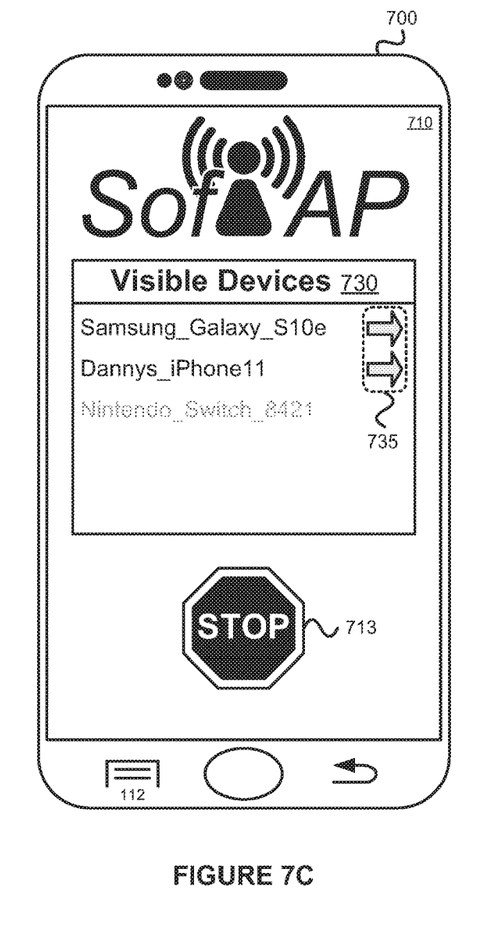

FIGS. 7A-7C illustrate a mobile handset 700 configured to mimic a Target AP and provide wireless network credentials to a STA as described in FIGS. 2, 3, and 6 above. In FIG. 7A, an application ("app") may be provided to instruct mobile handset 700 to mimic the Target AP. Along with apps for the mobile handset 700 to operate as a phone (701), address book (702), SMS/text interface (703), day planner/calendar (704), email client (705), map/GPS (706), and weather station interface (707), a SoftAP app (708) may also be provided. When a user selects the SoftAP app 708, a GUI (FIG. 7B; 710) may be opened to allow the user to control the mobile handset 700 as the SoftAP.

FIG. 7B illustrates one embodiment of the SoftAP app 710 running on mobile handset 700. The SoftAP app 710 may include a software WPS button 712 shown on the LCD of mobile handset 700. When a user presses WPS button 712, mobile handset may begin the SoftAP and the WPS session for nearby devices that are not already in operative wireless communication with an AP (not shown; described in FIGS. 2, 3, and 6).

FIG. 7C illustrates operation of the SoftAP app 710 on mobile handset 700. A list of visible device 730 may be displayed to allow a user to select devices that he/she wishes to provision onto the wireless network of the Target AP (such as router 601 of FIG. 6). A further GUI element 735 for passing wireless network credentials to new wireless devices may provide incremental control of provisioning. In another embodiment, a single "deliver" button may be provided and credentials may be passed to all devices that are visible to the mobile handset 700. In still another embodiment, wireless network credentials may be passed to new wireless devices automatically, with no additional input from the user other than the initiation of the SoftAP and WPS session. The SoftAP app may also include a "stop" button 713 for terminating the WPS session. Pressing the stop button 713 may merely terminate the WPS session in one embodiment. App 710 may remain open and new WPS session may be begun by pressing WPS button 712 again. In another it may terminate the WPS session and the SoftAP. The user may then provision additional devices by again selecting the SoftAP app 708 as shown in FIG. 7A.

The GUI of FIGS. 7A-7C may be used with existing hardware. In fact, a software change for the mobile handset (or any device that may be configured to mimic the Target AP) is all that is required. Furthermore, sharing of network credentials with a new STA by the intermediate device (mobile handset) need not require connection with the AP. Credentials may be provided to a wireless device (STA) even if the intermediate device is not on the wireless network for the AP (such as router 601). In this embodiment, app 710 may have an additional GUI element for selecting with network (or AP) for which wireless network credentials may be sent.

While the above description details a method for providing wireless network credentials using WPS for both the Target AP and the STA, through the Intermediary Device, in other embodiments, different protocols may be used for the interface between the Target AP and the Intermediary Device, for the interface between the Intermediary Device and the STA, or both.

FIGS. 8A-F illustrate various embodiments for providing wireless network credentials for a Target AP 804 to a STA 802 through an Intermediary Device 803.

Figure 8A:
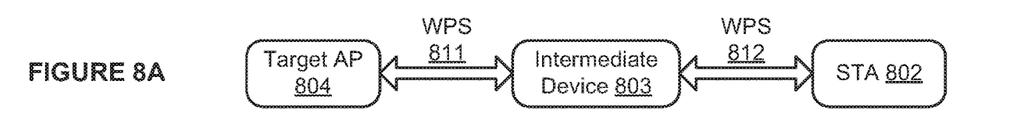
FIGS. 8A-F illustrate various schemes for providing wireless network credentials to a station via an intermediate device over a variety of protocols, according to some embodiments.

FIG. 8A illustrates the method described in FIGS. 2 and 3, wherein Intermediary Device 803 mimics Target AP 804, which is configured to provide wireless credentials over a WPS protocol 811. Intermediary Device 803 therefor provides wireless network credentials to STA 802 over WPS protocol 812.

Figure 8B:
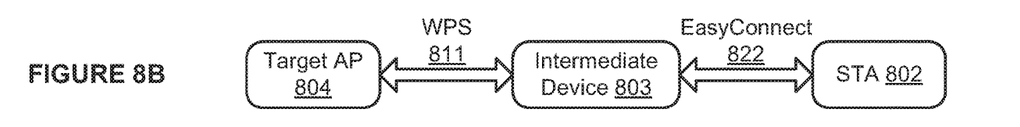

FIG. 8B illustrates a method wherein Target AP 804 communicates wireless network credentials over a WPS protocol 811, but STA 802 receives wireless network credentials over an EasyConnect protocol 822. In this scheme, the Target AP 804 and STA 802 may not be configured to communicate directly. The STA may not be able to receive wireless network credentials over WPS and the Target AP may not be able to transmit wireless network credentials over EasyConnect. Intermediary Device 803, therefore, operates as a bridge between Target AP 804 and STA 802, communicating with Target AP 804 over a WPS protocol 811 and with STA 802 over an EasyConnect protocol 822.

Figure 8C:
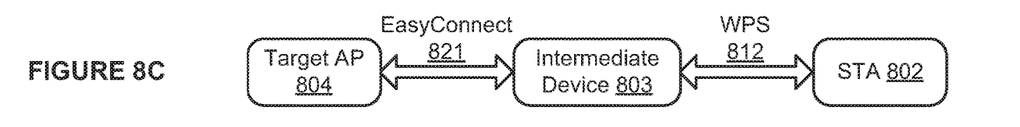

FIG. 8C illustrates a method wherein Target AP 804 communicates wireless network credentials over an EasyConnect protocol 821, but STA 802 receives wireless network credentials over a WPS protocol 822. This is the mirror image of the method of FIG. 8B. In this scheme, the Target AP 804 and STA 802 may not be configured to communicate directly. The STA may not be able to receive wireless network credentials over EasyConnect and the Target AP may not be able to transmit wireless network credentials over WPS. Intermediary Device 803, therefore, operates as a bridge between Target AP 804 and STA 802, communicating with Target AP 804 over an EasyConnect protocol 821 and with STA 802 over a WPS protocol 812.

Figure 8D:
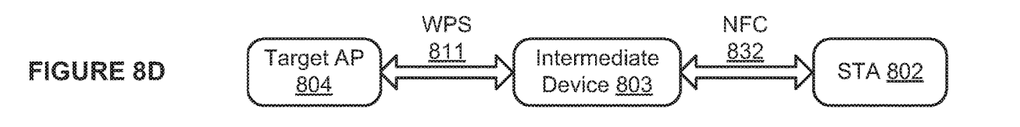

FIG. 8D illustrates a method wherein Target AP 804 communicates wireless network credentials over a WPS protocol 811, but STA 802 receives wireless network credentials over a near-field communication (NFC) protocol 832. In this scheme, the Target AP 804 and STA 802 may not be configured to communicate directly. The STA may not be able to receive wireless network credentials over WPS and the Target AP may not be able to transmit wireless network credentials over NFC, or may be too distant from STA 802 for NFC to function property. Intermediary Device 803, therefore, operates as a bridge between Target AP 804 and STA 802, communicating with Target AP 804 over a WPS protocol 811 and with STA 802 over an NFC protocol 822.

Figure 8E:
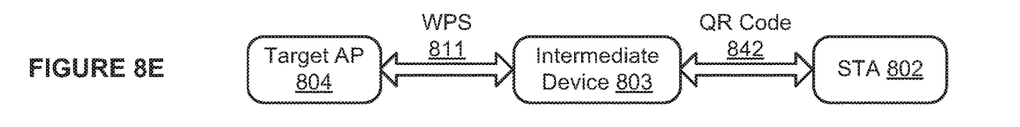

FIG. 8E illustrates a method wherein Target AP 804 communicates wireless network credentials over a WPS protocol 811, but STA 802 receives wireless network credentials by scanning a QR code 842 that may be displayed in Intermediary Device 803. In this scheme, the Target AP 804 and STA 802 may not be configured to communicate directly. The STA may not be able to receive wireless network credentials over WPS and the Target AP may not be accessible to provide a QR code, or may lack an interface through which to provide a visual display of the wireless network credentials. Intermediary Device 803, therefore, operates as a bridge between Target AP 804 and STA 802, communicating with Target AP 804 over a WPS protocol 811 and providing network credentials to STA 802 via QR code 842.

Figure 8F:
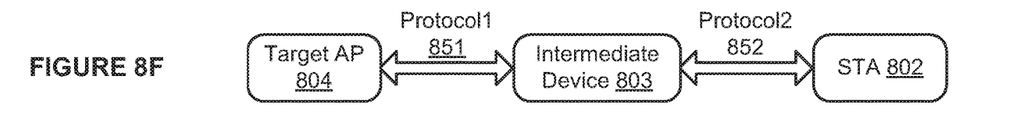

The specifics of the above schemes are intended as examples, only. FIG. 8F illustrates a method where a first protocol 851 is used to communicate between Target AP 804 and Intermediary Device 803 and a second protocol 852 is used to communicate between Intermediary Device 803 and STA 802. The reasons and mechanisms for the different protocols may vary. In various instances, Target AP 804 and STA 802 may not be able to communicate directly because of hardware/firmware/software incompatibilities. Target AP 804 may be too far away from STA 802 for protocols that require proximity. The devices may be operating under different standards, having been developed, released, or installed at different times. An intermediary device that is capable or communicating with both the Target AP and the STA may serve as a bridge to enable the transmission of wireless network protocols between devices that would be otherwise incapable of such.

Figure 9A:
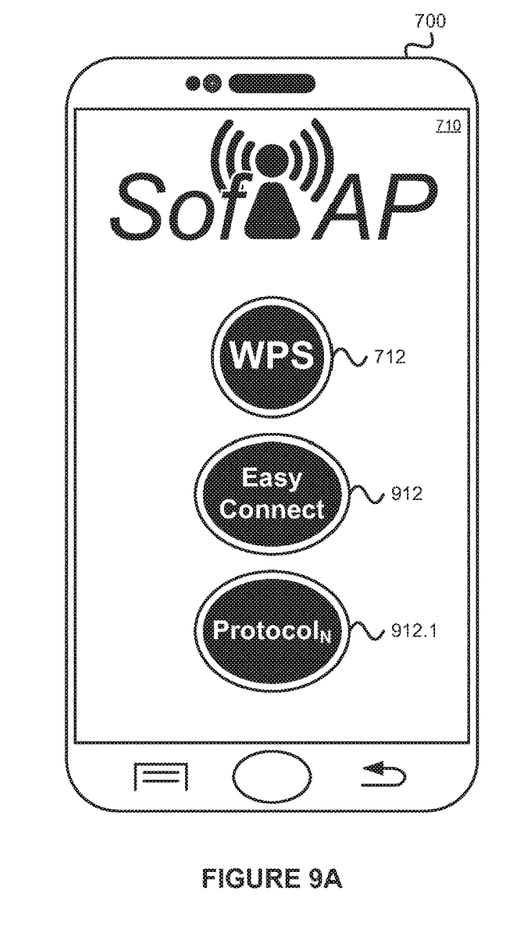
FIGS. 9A-C illustrate a graphical user interface (GUI) for enabling mimicking of a Target AP by an intermediate device for providing wireless network credential information to a station over a variety of protocols, according to various embodiments.
Figure 9B:
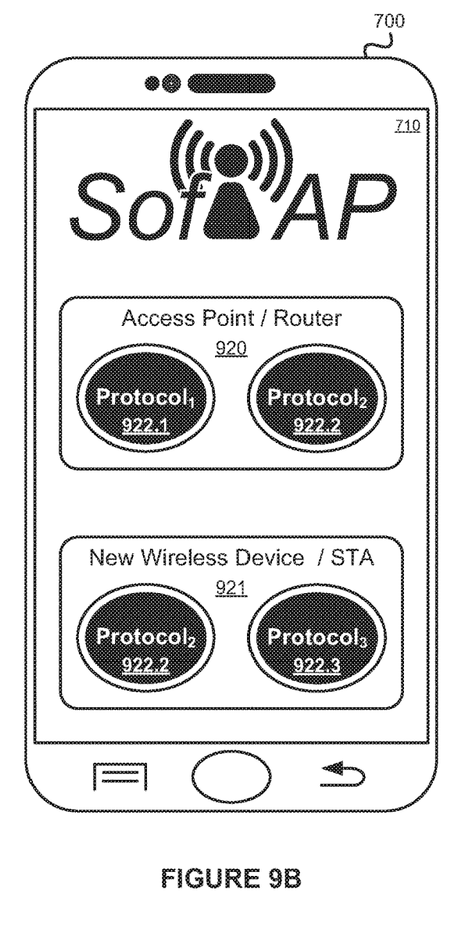
Figure 9C:
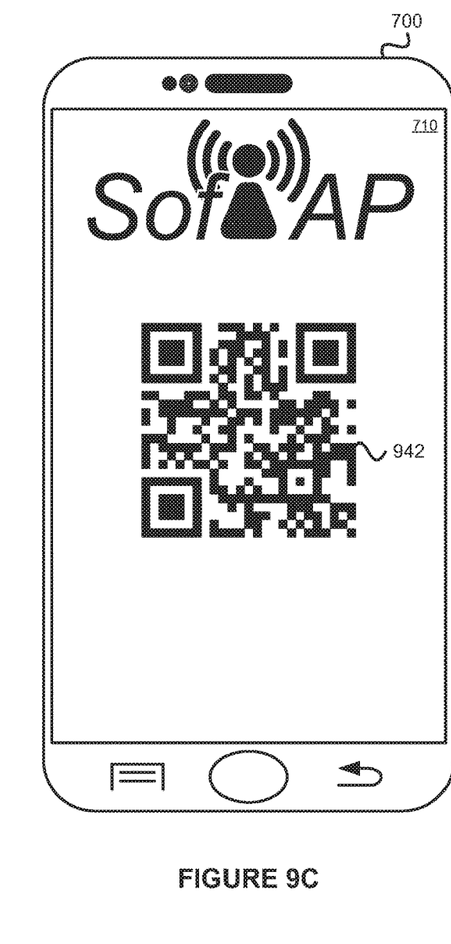

FIGS. 9A-C illustrates various embodiments of SoftAP app 710 for mobile handset 700, as described above with regard to FIGS. 7A-C, but with additional functionality corresponding to FIGS. 8A-F.

FIG. 9A illustrates SoftAP app 710 with multiple options for the communication of wireless network credentials. These options may include a WPS button, as described above with regard to FIG. 7B. The options may also include an EasyConnect button 912 for communication between a Target AP and a STA through an Intermediary Device over EasyConnect, instead of WPS. The options may further include another protocol (Protocol$_N$) 912.1. Protocol$_N$ 912.1 may be any protocol that is used to communicate wireless network credentials, as described with regard to FIG. 8F.

FIG. 9B illustrates the SoftAP app 710, wherein the protocol for communication between the Intermediary Device and the Target AP can be selected from a menu 920 of various protocols (e.g. Protocol$_1$ 922.1 and Protocol$_2$ 922.2). While two protocols are shown, one of ordinary skill in the art would understand that more or fewer than two protocols may be included in menu 920. Menu 921 may be used to provide options for communication between the Intermediary Device and the STA. These protocols may include Protocol$_2$ 922.2 and Protocol$_3$ 922.3. In one embodiment, menus 920 and 921 may share at least one protocol (in this case, Protocol$_2$ 922.2). But in other embodiments, there may be no overlap. The available protocols for communication with the Target AP and the STA may not coincide.

FIG. 9C illustrates the SoftAP app 710 configured to display a QR code 942 corresponding to the wireless network credentials for the Target AP, corresponding to the method shown in FIG. 8E. The STA may then image the QR code 942 to store the wireless network credentials locally for use in onboarding to the Target AP.

In the various embodiments of FIGS. 8A-F and FIGS. 9A-C, Intermediary Device 803 may be used to bridge communication between Target AP 804 and STA 802. This bridge may be to overcome protocol mismatches, physical/spatial availability, or usability concerns between Target AP 80 and STA 802.

As used herein, the term "coupled to" means connected directly, or connected indirectly through one or more intervening components over PCB tracks/pads, switches, buses, hubs, trace lines, and/or programmable interconnects, as the case may be. Any of the signals provided through various PCB tracks/pads, switches, hubs, traces, and programmable interconnects may be time multiplexed with other signals and provided over one or more common or dedicated buses and/or signal traces. Each of the buses may alternatively include one or more single signal traces, and one or more signal traces may alternatively perform the function of a bus.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for providing wireless network credentials to a station (STA) comprising:

mimicking an access point (AP) by an intermediary device, the intermediary device having previously paired with the AP, wherein mimicking the AP includes beginning a WPS session on the intermediary device;

performing, by the intermediary device, a WPS handshake with the STA;

upon completion of the WPS handshake, providing, by the intermediary device, network credentials to the STA;

terminating the WPS session on the intermediary device; and terminating mimicking of the AP by the intermediary device, wherein the intermediary device is a handheld device for displaying a graphical user interface GUI for initiating a soft AP session and a WPS handshake with the STA.

2. The method of claim 1, wherein the intermediary device is in concurrent operative communication with the AP and the STA.

3. The method of claim 2, wherein simultaneous operative communication with the AP and the STA by the intermediary device is by real-time simultaneous dual band (RSDB) or virtual simultaneous dual band (VSDB) operation of the intermediary device.

4. The method of claim 1, wherein network credentials are passed to the STA without input from the AP.

5. The method of claim 1, wherein the intermediary device is configured to provide network credentials to multiple stations (STAs) simultaneously.

6. The method of claim 1, further comprising, prior the providing network credentials, retrieving the network credentials for the AP stored in a memory location of the intermediary device.

7. The method of claim 1, wherein mimicking an AP comprises providing AP functionality by the intermediary device.

8. A non-transitory, computer-readable medium containing instructions for a controller of an intermediary device, the instructions for:

mimicking an access point (AP) by an intermediary device, the intermediary device having previously paired with the AP, wherein mimicking the AP includes beginning a WPS session on the intermediary device;

performing, by the intermediary device, a WPS handshake with the STA; upon completion of the WPS handshake, providing, by the intermediary device, network credentials to the STA;

terminating the WPS session on the intermediary device; and terminating mimicking of the AP by the intermediary device, wherein the intermediary device is a handheld device for displaying a graphical user interface GUI for initiating a soft AP session and a WPS handshake with the STA.

9. The non-transitory, computer-readable medium of claim 8, wherein the intermediary device is in concurrent operative communication with the AP and the STA.

10. The non-transitory, computer-readable medium of claim 9, wherein simultaneous operative communication with the AP and the STA by the intermediary device is by real-time simultaneous dual band (RSDB) or virtual simultaneous dual band (VSDB) operation of the intermediary device.

11. The non-transitory, computer-readable medium of claim 8, further comprising instructions for providing the graphical user interface (GUI) for initiation of the WPS session.

12. The non-transitory, computer-readable medium of claim 8, wherein instructions contained therein allow network credentials to be passed to the STA without input from the AP.

13. The non-transitory, computer-readable medium of claim 8, further including instructions to allow the intermediary device is configured to provide network credentials to multiple stations (STAs) simultaneously.

14. The non-transitory, computer-readable medium of claim 8, further comprising instructions for the retrieval of network credentials for the AP stored in a memory location of the intermediary device prior to providing the network credentials to the STA.

15. A system comprising:

a station (STA) configured to access a wireless network upon receipt of valid network credentials; and an intermediary device, the intermediary device previously associated with the wireless network, wherein the intermediary device is configured to:

provide access point (AP) functionality corresponding to an access point of the wireless network, provide network credentials to the STA while mimicking the AP, and terminate a soft AP session over which network credentials to the STA are provided, the termination of the soft AP session to allow the STA to associate with the AP, wherein the intermediary device is a handheld device for displaying a graphical user interface GUI for initiating a soft AP session and a WPS handshake with the STA.

16. The system of claim of claim 15, wherein the intermediary device has a first wireless communication range that is less than a second wireless communication range of the AP.

17. The system of claim 15, wherein the intermediary device is capable of operative communication with the AP as a STA simultaneous to operative communication with the STA as an AP.

* * * * *